United States Patent [19]

Evans

[11] Patent Number: 4,711,566

[45] Date of Patent: Dec. 8, 1987

[54] APPARATUS FOR ELECTRONIC SCANNING AND MICROFILMING OF DOCUMENTS

[75] Inventor: Bruce M. Evans, Columbia Heights, Minn.

[73] Assignee: Minnesota Mining and Manufacturing Company, St. Paul, Minn.

[21] Appl. No.: 793,674

[22] Filed: Oct. 31, 1985

[51] Int. Cl.⁴ .............................................. G03B 27/52
[52] U.S. Cl. ........................................ 355/41; 355/43; 355/54; 355/64; 355/69
[58] Field of Search ...................... 355/41, 43, 46, 54, 355/64, 65, 77, 5, 68, 69; 358/256, 286, 300; 353/26 A; 235/375, 475

[56] References Cited

U.S. PATENT DOCUMENTS

| | | | |
|---|---|---|---|
| 3,773,419 | 11/1973 | Sumner et al. | 355/43 |
| 4,277,805 | 7/1981 | Sato | 358/286 |
| 4,283,621 | 12/1981 | Pembroke | 235/375 |
| 4,414,579 | 12/1983 | Dattilo et al. | 358/256 |
| 4,510,619 | 4/1985 | Le Brun et al. | 235/475 X |

Primary Examiner—L. T. Hix
Assistant Examiner—D. Rutledge
Attorney, Agent, or Firm—Donald M. Sell; James A. Smith; Robert L. Marben

[57] ABSTRACT

Apparatus using a single document transport means for microfilming the document and scanning the document for obtaining digital signals for storage that are indicative of the image carried on the document. One embodiment provides for sequential presentment of the document for filming and scanning. Another embodiment provides for simultaneous filming and scanning. Circuitry is disclosed by which the digital signals are processed for use in controlling the light source used for filming of the document. Circuitry is disclosed for supplying information for later retrieval of the digital signals and/or the microfilm for a particular document.

2 Claims, 7 Drawing Figures

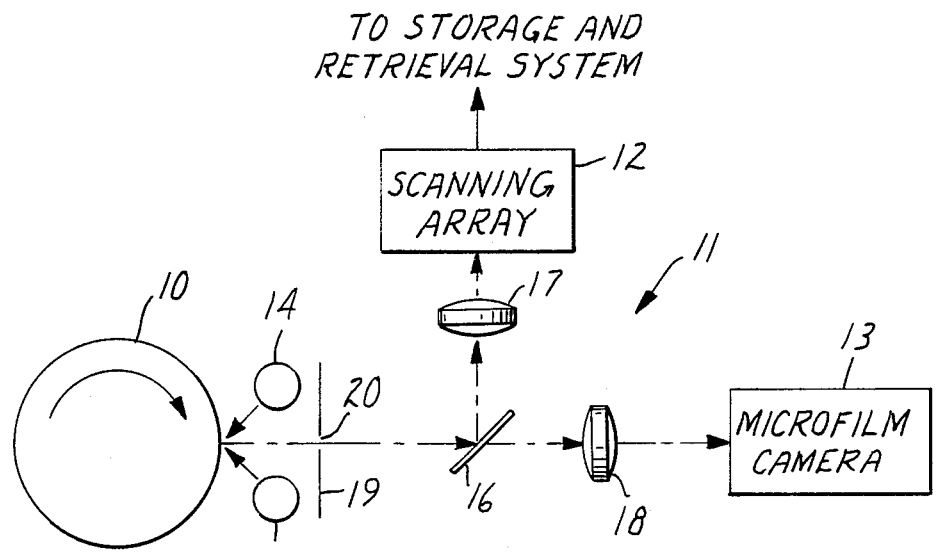
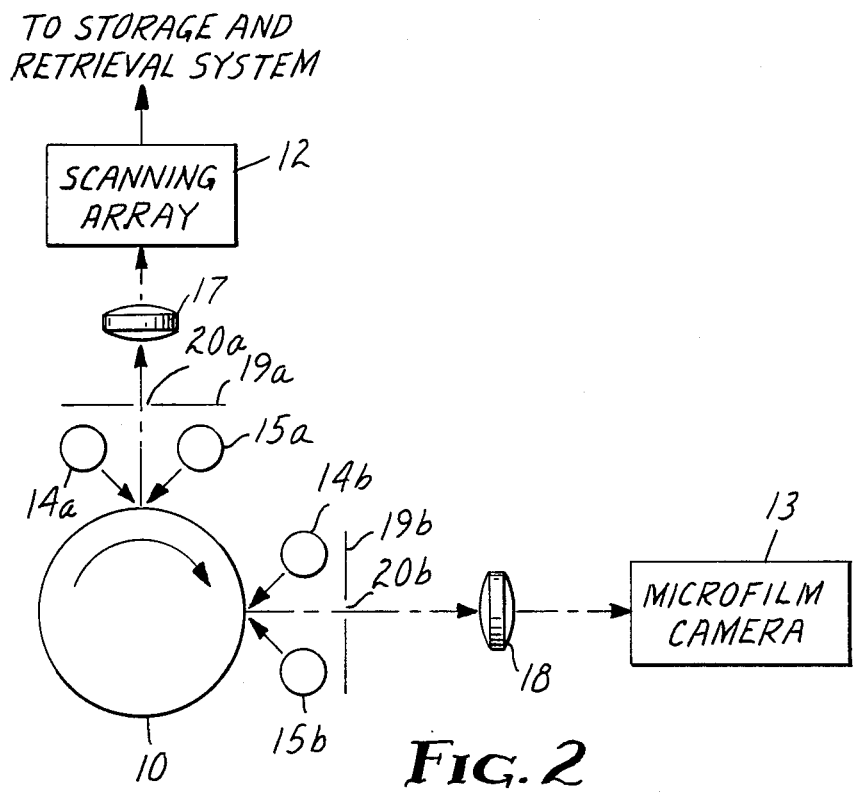

APPARATUS FOR ELECTRONIC SCANNING AND MICROFILMING OF DOCUMENTS

BACKGROUND OF THE INVENTION

The present invention relates to the storage of an image carried by a document for later retrieval and, in particular, to apparatus providing for both microfilming a document and the production of digital signals representative of the document image for storage in a memory.

Microfilming of documents for long term storage is well known and is used by many businesses. The development of very high capacity memory devices, such as magnetic tape and optical or magnetic discs, for the storage of electronic digital signals has made it economically feasible to store information in accordance with digital signals obtained from the scan of a large number of documents for retrieval at a later time for the production of the images carried by the documents. A hard copy, such as can be obtained by the use of facsimile machine techniques, or a temporary viewable image, such as can be available by the use of a cathode ray tube (CRT), can be produced.

Since both forms of storage may be required for some documents, it is desirable that the handling of the documents be minimized for accomplishing both forms of storage and that such storage be carried out in such a manner that the locations of the document on microfilm and in memory can be readily cross-referenced, if desired. It is important also that the complexity of the apparatus for processing the documents be minimized.

SUMMARY OF THE INVENTION

The invention presented herein is embodied in apparatus that minimizes the handling of documents for storage on microfilm and for obtaining digital signals representative of the image carried on a document for storage in memory, such as by the use of magnetic tape, magnetic disc or an optical disc. Apparatus embodying the invention includes a document transport means providing a movable surface for receiving a document to be processed for microfilm and electronic storage; a light responsive electronic scanning array; a microfilm camera and optical means for exposing the document carried by the document transport means to light and directing the light reflected from the document to the light responsive electronic scanning array for the generation of digital signals representative of the image carried on the document presented by the document transport means and to the microfilm camera for the exposure of film in accordance with the light directed to the microfilm camera.

In one embodiment the optical means includes a light source for exposing the document to light and a half or beam splitter mirror for dividing the light reflected from the document to direct a portion of the light to the microfilm camera and a portion to the light responsive electronic scanning array.

In another embodiment the optical means includes two light sources, one source for exposing the document to light as it is moved past a first scanning position by the document transport means with the light reflected from the document directed to the light responsive electronic scanning array with the second light source operative during movement of the document past a second scanning position by the document transport means for exposing the document to light with the reflected light directed to the microfilm camera. Microfilming can take place before or after the scan of the document by the scanning array. In the case of this embodiment, wherein two light sources are provided by the optical means, the microfilm camera can be of the rotary or planar type. When a planar type of microfilm camera is used which provides full frame exposure, the document transport means is then of a form, such as a driven belt or platen that provides a planar surface for the document at a portion of its movement during which the document transport is stopped for operation of the planar microfilm camera to record the document.

A benefit is obtained in the case of the second embodiment, wherein two light sources are provided for sequential image storage operations with the document initially presented for scanning by the light responsive electronic array. The output from the light responsive electronic array is used to provide a measure of the background density of the document which is useful for altering the intensity of the light or the exposure setting for the microfilm camera when the document is filmed to enhance the contrast of the filmed image.

The apparatus of the present invention also includes means, such as a keyboard, for generating a film cartridge identifying number and a starting number frame count for a film cartridge inserted in the microfilm camera plus control logic means for incrementing the frame count for each document and transmitting such numbers for storage and a keyboard, such as one available at a CRT terminal, for transmitting a description for each document for storage with the frame count and film cartridge number transmitted for each document described. The storage and retrieval system used with the apparatus for storing the digital signals produced by the scanning array will provide and store an electronic storage index number for such signals for each document scanned and also store the document description plus the frame count and film cartridge number for each document. This arrangement allows a document to be retrieved on the basis of description, frame count plus film cartridge number as well as an electronic storage index number.

BRIEF DESCRIPTION OF THE DRAWINGS

The foregoing feature and advantage of the invention will be apparent from the following detailed description presented in conjunction with the accompanying drawings, wherein:

FIG. 1 is a block diagram showing of one apparatus embodying the invention;

FIG. 2 is a block diagram showing of another apparatus embodying the invention;

DETAILED DESCRIPTION

Figure 3:
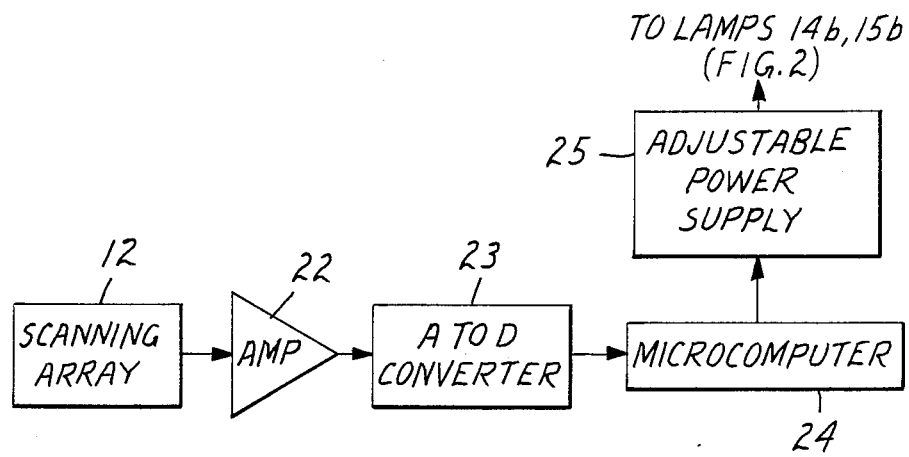
FIG. 3 is a block diagram showing of circuitry for use with the apparatus of FIG. 2.

Referring to FIG. 1 of the drawing, apparatus is schematically shown which embodies the invention presented herein and includes a document transport means 10 for providing a movable surface at which a document to be processed is received and is carried by the transport means past an optical means indicated generally at 11. While the document transport means 10 is shown, by way of example, in the form of a drum, its function does not limit its form to a drum. For example, a platen arranged for reciprocal movement or a movable belt structure can be used. The apparatus also includes a light responsive electronic scanning array 12 and a microfilm camera 13. The scanning array 12 can, for example, take the form of a linear array of elements of the CCD (charged-coupled-device) type, which are well known. For example, arrays of this type have been used in scanning arrangements for facsimile machines for obtaining electrical signals representative of a document is scanned by such an array. As a document carried on the transport means 10 is moved past the optical means 11, the optical means 11 directs light toward the transport means 10 and directs the light reflected from the document to the scanning array 12 as well as to the microfilm camera 13. The optical means 11 includes a light source, which in FIG. 1 includes two lamps 14 and 15, the output of which is directed toward the transport means 10. The optical means 11 also includes a beam splitter mirror 16 positioned for receiving the light reflected from the document. The beam splitter mirror 16 reflects a portion of the light it receives with a portion of the light it receives passing through it. The optical means 11 also includes two lens systems 17 and 18 for condensing and focusing the light image. The lens system 17 receives the portion of the light that is reflected by the mirror 16 with lens system 18 receiving the portion of the light passed by the mirror 16. The output from lens system 17 is directed to the electronic scanning array 12, while the output from lens system 18 is directed to the microfilm camera 13. The positions of the electronic scanning array 12 and the microfilm camera 13 are not dependent on how the light image is transmitted to them so their positions can be reversed. Since the apparatus is to provide a scan by the electronic scanning array 12 and the microfilm camera 13 of a document carried by the document transport means 10, the optical means 11 includes a light barrier 19 which has an opening in the form of a narrow slit 20 through which light reflected from the document passes to the mirror 16. Since a line image will be passed by the slit 20, the microfilm camera 13 in the apparatus of FIG. 1 is of the rotary type. The narrow slit 20 is oriented so it is transverse to the direction of movement of the document transport means 10.

Another embodiment of the invention is provided by the apparatus shown schematically in FIG. 2 wherein elements which provide the same or similar function as elements described for the apparatus of FIG. 1 are identified using the same reference numerals as those used in FIG. 1 or the same reference numerals to which a letter is added. The apparatus of FIG. 2, like the apparatus of FIG. 1, has an electronic scanning array 12, a microfilm camera 13 and a document transport means 10 for movement of a document to be scanned by the array 12 and the camera 13. The apparatus of FIG. 2 also includes an optical means 11 which provides the electronic scanning array 12 and the microfilm camera 13 with a light image created by light reflected from the document carried by the document transport means 10. As in FIG. 1, optical means 11 includes a lens system 17 and lens system 18 for condensing and focusing the light image provided by light reflected from the document for use at the electronic scanning array 12 and the microfilm camera 13, respectively. Unlike the apparatus of FIG. 1, the optical means 11 for the apparatus of FIG. 2 has two light barriers 19a and 19b, each provided with a narrow slit positioned to extend transverse to the direction of movement of the document. Light barrier 19a has a narrow slit 20a and light barrier 19b has a narrow slit 20b. Light passed by the narrow slit 20a is directed to the lens system 17, while light passed by the narrow slit 20b is directed to lens system 18. Light is directed toward the document transport means 10 by the use of two lamps 14a and 15a and is reflected from a document presented opposite the narrow slit 20a for passage to the electronic scanning array 12 via the narrow slit 20a and lens system 17. The document transport means 10 rotates counterclockwise, as viewed in FIG. 2 and as indicated by arrow 21, to cause a document carried by the transport means 10 to pass opposite the narrow slit 20b after it has passed the narrow slit 20a. Light is directed toward the document transport means 10 by the use of lamps 14b and 15b and is reflected from a document as it is moved past the narrow slit 20b. The light that is reflected passes through the narrow slit 20b to the microfilm camera 13 via the lens system 18. Contact type image sensor units, such as the PC1 and PC3 series available from Matsushita Communications System, Inc., Tokyo 104, Japan, are units that provide a compact assemblage of components which provide the functions of the electronic scanning array 12, narrow slit 20a, lens system 17 and light sources 14a and 15a.

Referring to the apparatus of FIG. 2, it can be seen that a document provided for movement by the document transport means 10 is first scanned by the electronic scanning array 12 as the document is moved past the narrow slit 20a to provide signals representative of the image carried by the document. Such signals are analog signals which can be readily processed to put them in digital form. The digital signals can be magnetically stored or stored on an optical disc wherein recording is accomplished by a laser which receives the digital signals as input control signals for the laser. After passing the narrow slit 20a the document is presented to the narrow slit 20b for scanning by the microfilm camera 13 as light directed to the document from lamps 14b and 15b is reflected and passed by the narrow slit 20b and the lens system 18 to the microfilm camera 13, which is the rotary type.

The apparatus of FIG. 2, wherein the document is scanned by the electronic scanning array 12 before the document reaches the microfilm illumination station, permits usage of the output from the scanning array 12 to provide for control of the intensity of lamps 14b and 15b to compensate for the background density of the document when the microfilm camera is operated.

Circuitry for providing the automatic background compensation mentioned above is shown in FIG. 3 and is connected to the output of the electronic scanning array 12 for the apparatus of FIG. 2. The circuitry includes an amplifier 22, an analog to digital converter 23, a microcomputer 24 and an adjustable power supply 25 for lamps 14b and 15b. The aforementioned elements are connected in series in that order set forth. The amplifier 22 is connected to the output of the electronic scanning array 12 of FIG. 2 for amplifying the analog signals from the array 12. The output of the amplifier 22 is applied to the analog to digital converter 23 which converts the analog signals to digital values which represent gray scale levels. These digital values are applied to the microcomputer 24 where a software algorithm that has been entered in the microcomputer is used to average the digital values to determine the background density of the document that is scanned. A signal representative of this background density value is applied to adjustable power supply 25 for the lamps 14b and 15b whereby the intensity of the lamps is changed to a level in accordance with the background density measurement. By providing this adjustment of the exposure level, the contrast of the filmed image is enhanced.

Figure 4:
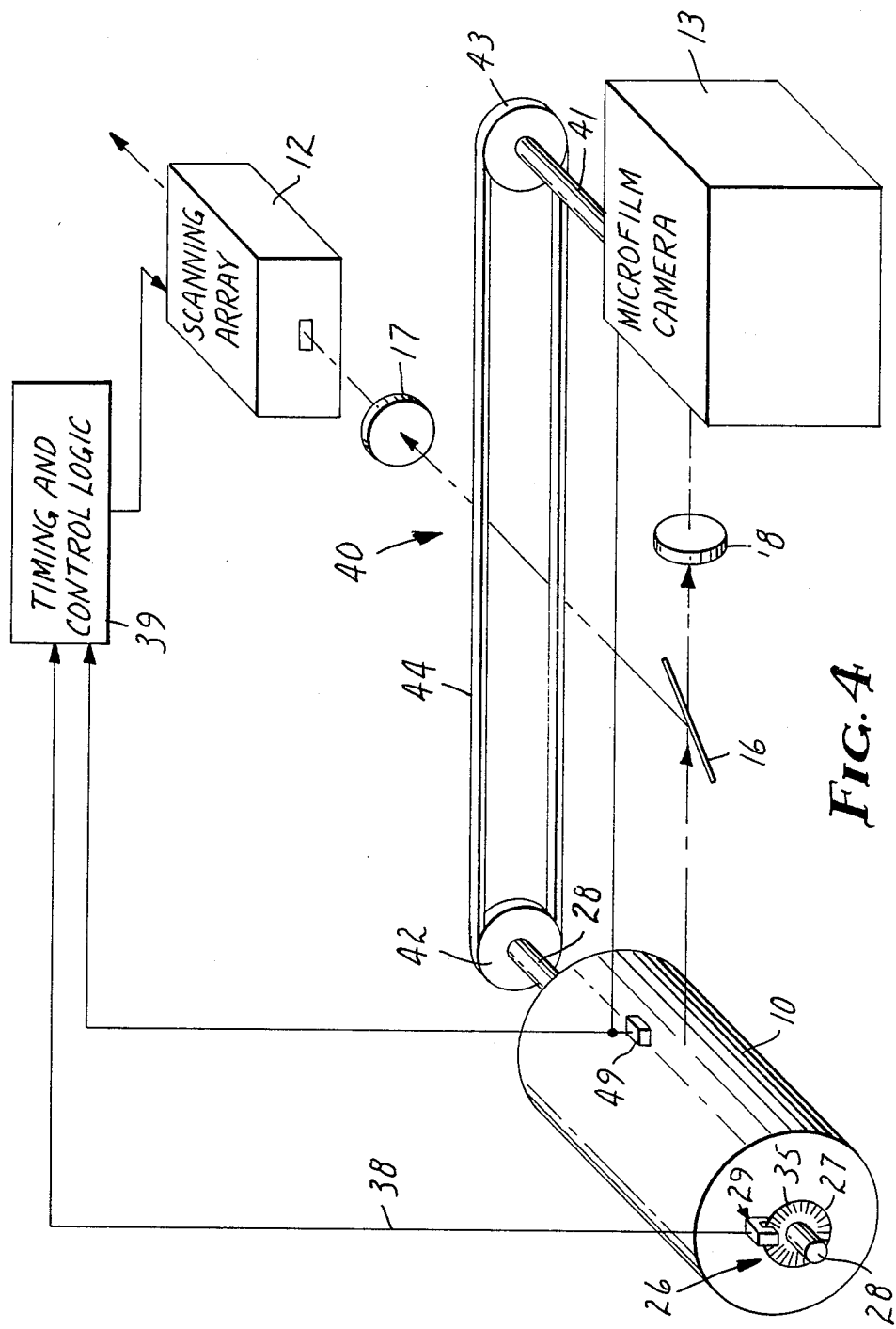
FIG. 4 is a block diagram showing of an arrangement for use with the apparatus of FIGS. 1 and 2 for correlating the operation of various portions of the apparatus.

It is necessary that the movement of the document transport means 10 be coordinated with the operation of the scanning array 12 and the operation of the microfilm camera 13. One way by which this can be accomplished is shown in FIG. 4 wherein elements which provide the same or similar function as elements described for the apparatus of FIG. 1 are identified using the same reference numerals as those used in FIG. 1. The apparatus of FIG. 4 is like that of FIG. 1 but some of the elements of FIG. 1 not shown since they are not needed for illustrating the manner in which the movement of the document transport means 10 is coordinated with the operation of the scanning array 12 and the operation of the microfilm camera 13.

Figure 5:
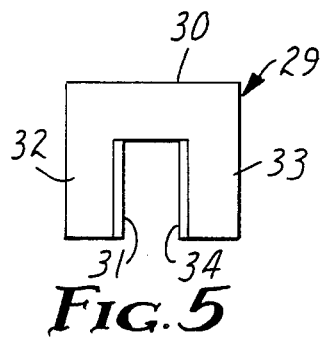
FIG. 5 is a detailed view of one element of the apparatus of FIG. 4.

Referring to FIG. 4, the document transport means 10, scanning array 12, microfilm camera 13, beam splitter mirror 16, and the lens systems 17 and 18 of FIG. 1 are shown and operate as described for FIG. 1. Since the scanning array 12 provides a line-by-line scan of a document carried by the drum 10, it is necessary that scanning array 12 know when each line scan position is reached by the document transport 10. This is accomplished by the use of a line sensing means 26 which includes a disc 27 carried by the shaft 28 for the document transport means 10. The shaft 28 provides a direct position relationship with a document carried by the drum transport means 10. The line sensing means 26 also includes an optical sensing device 29 which is shown in greater detail in FIG. 5. The optical sensing device 29 is of the type wherein a U-shaped support structure 30 is provided for positioning a light source 31, such as a light emitting diode, in one leg 32 of the structure 30. Light from the light source 31 is directed from the inner surface of the leg 32 toward the inner surface of the other leg 33 where a light-to-electric transducer 34, such as a phototransistor, is positioned to receive the light from the light source 31. The optical sensing device 29 is positioned to straddle the disc 27. The disc 27 is formed with radially extending, equally spaced slits indicated by the lines 35 on the disc 27 as shown in FIG. 4. The spacing between the slits is dependent on the line resolution that is required for scanning. Each slit represents a line scan position for a document carried by the document transport means 10. It can be appreciated that a series of holes, each at a given radial distance on the disc, can be made in the disc 27 instead of using slit-like openings. Each opening 35 will be presented, as the disc 27 is rotated, to allow light to pass through it from the light source 31 to the transducer 34. If a higher line resolution is required than can be accommodated by a single series of openings, two or more circular rows of holes can be used with a separate light source and transducer combination provided for each row of holes. The required number of light source/transducer combinations can be mounted in one U-shaped support structure 30. The offset needed between sensings made in one row and the next row can be established by offsetting the circular rows of holes or by the positioning used for the light source/transducer combinations. For example, the light source/transducer combinations can be positioned so the light sources are in a straight line in the legs of the support structure 30 with the legs of the structure 30 positioned when the disc 27 is straddled by the legs of structure 30 so a line drawn through the light sources does not pass through the center of the shaft 28 on which the disc 27 is carried. It is also possible to employ more than one of the disc 27/optical sensing device 29 combinations wherein readings by one combination is offset with respect to readings obtained by another combination to provide greater line resolution than can be obtained from a single disc/optical sensing device combination. Another solution for increasing the resolution that is provided by a disc 27/optical sensing device 29 combination requires use of the disc 27/optical sensing device 29 output for initiating line scans plus the use of a delay circuit connected to the output of the optical sensing device 29 for supplying a line scan initating signal for each output signal produced by the device 29.

It is also possible to have the disc 27/optical sensing device 29 combination provide a single signal to initiate operation of a pulse generator which would provide a series of pulses, each of which can be used to initiate a new scan line. However, this solution would not provide for any correction should the velocity of the document transport means 10 vary. A variation of the velocity of the document transport means 10 or a change to a completely different velocity does alter the accuracy of the timing provided for initiation of each scan line when a disc 27/optical sensing device 29 combination(s) is used to supply the scan line initiation signal since the disc 27 is connected directly to the shaft 28 of the document transport means 10.

Figure 6:
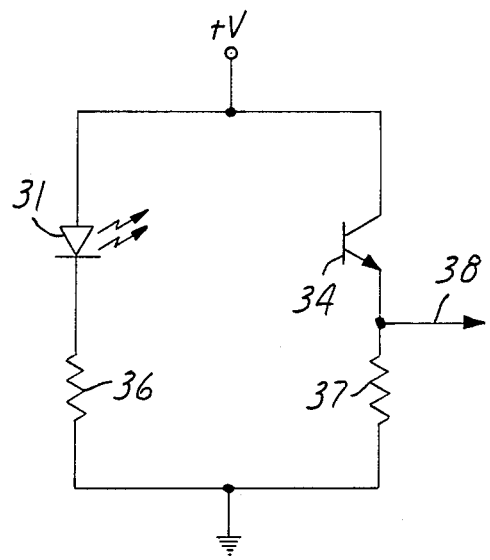
FIG. 6 is an electrical schematic of the element showing in FIG. 5.

An electrical schematic of the optical sensing device 29 is shown in FIG. 6 wherein the light source is a light emitting diode 30 that is connected in series with a current limiting resistor 36 with the series combination connected between a positive voltage source, +V, and ground. The light-to-electric transducer is a phototransistor 34 which is connected in series with load resistor 37 with such series combination connected between the positive voltage, +V, and ground. An output of the optical scanning device 29 is provided at the connection 38 between the phototransistor 34 and resistor 37. If necessary the output signal can be amplified. A timing and control logic 39 is connected between the output 38 of the optical sensing device 29 and the scanning array 12 serving to initiate a scan for each new line position for a document carried by the document transport 10.

Coordination of the operation of the microfilm camera 13 with the movement of a document carried by the document transport means 10 is readily provided by utilization of an arrangement used in currently available apparatus for the microfilming of documents such as the EF 5000 rotary microfilm camera sold by Minnesota Mining and Manufacturing Company, St. Paul, Minn. Such an arrangement includes a mechanical linkage means 40 connected between the shaft 28 of the document transport means 10 and a drive shaft 41 for the camera 13, which is a rotary type camera. Shaft 28 is provided with a pulley 42 and shaft 41 is provided with a pulley 43 with a drive belt 44 used to couple the pulleys. The drive shaft 41 is coupled to the camera 13 via an electrically controlled clutch (not shown). The clutch is actuated by a document sensing switch 49 positioned in the document path near the document transport means 10. The clutch is engaged by actuation of the document sensing switch 49 in response to a document that is presented for processing. Actuation of the switch 49 is also utilized to initiate operation of the timing and control logic 39 for the scanning array 12 so the logic 39 can respond to the output of the line sensing means 26. In the case of the embodiment shown in FIG. 2, a separate document sensing switch 49 would be used to detect the presence of a document at the point where the scanning by the scanning array 12 was to begin with such separate switch connected to the timing and control logic 39 for the scanning array 12.

Figure 7:
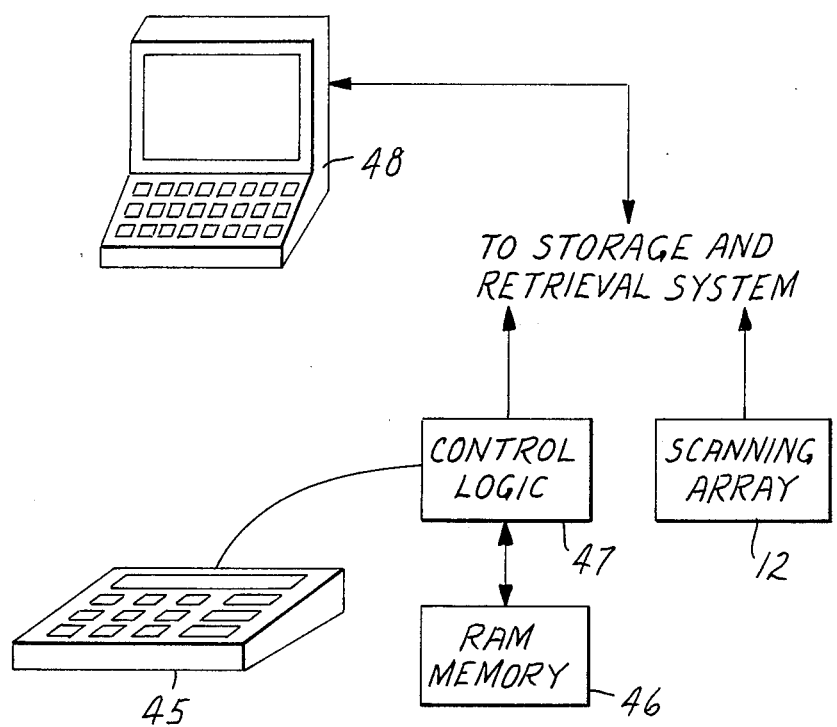
FIG. 7 shows additional elements used with the apparatus of FIGS. 1 and 2.

It is desirable that the storage location of a document on microfilm and the storage location of a document in memory be correlated to maximize the utilization of the two storage locations. This is accomplished by providing additional elements for use with apparatus shown in FIGS. 1 and 2. This requires an electronic keyboard 45, a random access memory (RAM) 46, control logic 47, and a CRT terminal 48 as shown in FIG. 7 wherein the keyboard output is applied to the control logic 47 which is connected to the RAM 46 and has an output which is sent to the same storage and retrieval apparatus (not shown) as the output from the scanning array 12. The CRT terminal 48 is connected to the storage and retrieval apparatus for the scanning array 12 to provide a visual verification that a document has been scanned satisfactorily. The CRT terminal 48 includes an input keyboard so information can be generated for supply to the storage and retrieval apparatus.

The microfilm camera 13 is the type which uses a film cartridge. Each time a new cartridge is inserted in the camera 13, the operator notes the cartridge identifying number and by use of the keyboard 45 enters the cartridge identifying number together with a starting number for the frame count. As each document is scanned and filmed with the apparatus of FIGS. 1 or 2, the control logic 47 increments the frame count and transmits the appropriate cartridge and frame number to the storage and retrieval system (not shown) that is connected to the CRT terminal 48 and the scanning array. Entry is then made at the CRT terminal of a description of the document for storage with the cartridge and frame number as well as an electronic storage index number generated at the storage and retrieval system (not shown). The storage and retrieval system correlates the microfilm cartridge and frame number, the electronic storage index number and document description with such information stored in a table in memory provided by the storage and retrieval system. The cartridge and frame number, document description or storage index number can be used at some later time with the CRT terminal 48 to obtain the other identifying information to enable one to locate the microfilm cartridge and frame for making a hard copy from the microfilm by use of a microfilm reader-printer or to locate the scanning signals storage per the storage index number for a document for providing display at the CRT terminal 48 of the stored document.

The invention presented herein may be embodied in other specific forms without departing from the spirit or essential characteristics thereof. The embodiments presented are, therefore, to be considered in all respects as illustrative and not restrictive, the scope of the invention being indicated by the appended claims rather than by the foregoing description and all changes which come within the meaning and range of equivalency of the claims are, therefore, intended to be embraced therein.

I claim:

1. Apparatus for storing documents on microfilm and for obtaining digital signals representative of the image present on a document for storage in a memory, including:

a document transport means providing a movable surface for receiving a document;

a light responsive electronic scanning array;

a microfilm camera; and optical means for exposing a document to light when carried by said document transport means, said optical means including a beam splitter mirror for directing the light reflected from the document to said light responsive electronic scanning means for the generation of digital signals representative of the image carried on the document and to said microfilm camera for exposure of film in accordance with the light directed to said microfilm camera.

2. Apparatus for storing documents on microfilm and for obtaining signals representative of the image present on a document for storage in a memory, including:

a document transport means providing a movable surface for receiving a document;

a light responsive electronic scanning array;

a microfilm camera;

optical means, including two light sources, for first exposing a document to light from one of said two light sources when carried by said document transport means and directing the light reflected from the document to said light responsive electronic scanning means for the generation of digital signals representative of the image carried on the document and then exposing the document to light from the other of said two light sources and directing the light reflected from the document to said microfilm camera for exposure of film in accordance with the light directed to said microfilm camera;

an adjustable power supply for said other of said two light sources; and means connected between said light responsive electronic scanning means and said adjustable power supply for adjusting the output of said adjustable power supply according to the average of the output of said light responsive electronic scanning means whereby the intensity of said other of said two light sources providing light to said microfilm camera is varied in accordance with the average of said output of said light responsive electronic scanning means.

* * * * *